(12) United States Patent
Czerwik

(10) Patent No.: US 11,699,212 B2
(45) Date of Patent: *Jul. 11, 2023

(54) METHOD OF CONTROLLING ENCODING OF DISPLAY DATA

(71) Applicant: DisplayLink (UK) Limited, Cambridge (GB)

(72) Inventor: Dominik Czerwik, Katowice (PL)

(73) Assignee: DISPLAYLINK (UK) LIMITED, Cambridge (GB)

( * ) Notice: Subject to any disclaimer, the term of this patent is extended or adjusted under 35 U.S.C. 154(b) by 59 days.

This patent is subject to a terminal disclaimer.

(21) Appl. No.: 17/469,803

(22) Filed: Sep. 8, 2021

(65) Prior Publication Data

US 2022/0076380 A1 Mar. 10, 2022

Related U.S. Application Data

(63) Continuation of application No. 16/574,377, filed on Sep. 18, 2019, now Pat. No. 11,145,030.

(30) Foreign Application Priority Data

Sep. 27, 2018 (GB) ...................................... 1815747

(51) Int. Cl.
*G06V 10/00* (2022.01)
*G06T 3/40* (2006.01)
(Continued)

(52) U.S. Cl.
CPC .............. *G06T 3/4084* (2013.01); *G06T 9/00* (2013.01); *H04N 19/12* (2014.11);
(Continued)

(58) Field of Classification Search
CPC .... H04N 19/136; H04N 19/172; H04N 19/18; H04N 19/60; H04N 19/12; H04N 19/176;
(Continued)

(56) References Cited

U.S. PATENT DOCUMENTS 4,698,689 A * 10/1987 Tzou ...................... H04N 19/60
358/426.14
5,121,216 A    6/1992 Chen et al.
(Continued)

OTHER PUBLICATIONS

U.K. Combined Search and Examination Report, dated Apr. 28, 2022, from U.K. Patent Application No. GB2204101.6, pp. 1-5.
(Continued)

*Primary Examiner* — Amir Alavi
(74) *Attorney, Agent, or Firm* — Paradice & Li LLP

(57) ABSTRACT

Systems and methods of encoding display data include performing a part of a first predetermined transform algorithm on at least a first part of a first frame of display data, and analyzing a light level to determine whether a different transform algorithm would be more suitable for encoding a second part of the first frame of the display data. If it is determined that a different transform algorithm would be more suitable for encoding, the second part of the first frame of the display data is encoded using the different transform algorithm to generate an encoded first frame. If it is determined that a different transform algorithm would not be more suitable for encoding, the second part of the first frame of the display data is encoded using the first predetermined transform algorithm to generate the encoded first frame.

20 Claims, 8 Drawing Sheets

(51) Int. Cl.
*H04N 19/12* (2014.01)
*H04N 19/176* (2014.01)
*H04N 19/18* (2014.01)
*H04N 19/60* (2014.01)
*G06T 9/00* (2006.01)

(52) U.S. Cl.
CPC ........... *H04N 19/176* (2014.11); *H04N 19/18* (2014.11); *H04N 19/60* (2014.11)

(58) Field of Classification Search
CPC .......... H04N 7/50; H04N 7/30; H04N 7/2644; H04N 7/26313; H04N 7/26106; H04N 7/26085; G06T 3/4084; G06T 9/00; G06T 9/007
See application file for complete search history.

(56) References Cited

U.S. PATENT DOCUMENTS

| | | | |
|---|---|---|---|
| 5,164,831 A | 11/1992 | Kuchta et al. | |
| 5,237,410 A | 8/1993 | Inoue | |
| 5,293,434 A | 3/1994 | Feig et al. | |
| 5,682,152 A | 10/1997 | Wang et al. | |
| 6,014,466 A | 1/2000 | Xia et al. | |
| 6,031,937 A | 2/2000 | Graffagnino | |
| 6,049,630 A | 4/2000 | Wang et al. | |
| 6,115,423 A * | 9/2000 | Shen | H04N 19/18 375/E7.145 |
| 6,760,479 B1 | 7/2004 | Feria | |
| 6,983,017 B2 * | 1/2006 | Chen | H04N 19/159 375/E7.181 |
| 8,107,527 B1 * | 1/2012 | Hobbs | H04N 19/164 375/240.2 |
| 8,228,993 B2 * | 7/2012 | Priti | H04N 19/467 375/240 |
| 8,345,768 B1 * | 1/2013 | Hobbs | H04N 19/34 375/240.26 |
| 8,620,098 B2 | 12/2013 | Liu et al. | |
| 9,235,905 B2 * | 1/2016 | Ignatchenko | G06T 9/00 |
| 9,838,704 B2 * | 12/2017 | Wang | H04N 19/436 |
| 10,476,927 B2 * | 11/2019 | Venkatesh | H04L 67/08 |
| 10,911,337 B1 * | 2/2021 | De Kosnik | H04L 67/52 |
| 11,145,030 B2 * | 10/2021 | Czerwik | G06T 9/00 |
| 2003/0123739 A1 | 7/2003 | Graffagnino | |
| 2006/0161427 A1 | 7/2006 | Ojala | |
| 2008/0306975 A1 * | 12/2008 | Michaelson | G06F 40/174 |
| 2015/0381993 A1 | 12/2015 | Lim | |
| 2020/0104979 A1 | 4/2020 | Czerwik | |

OTHER PUBLICATIONS

UK Search Report for Application No. GB1815747.9, dated Mar. 26, 2019, (3 pages).

* cited by examiner

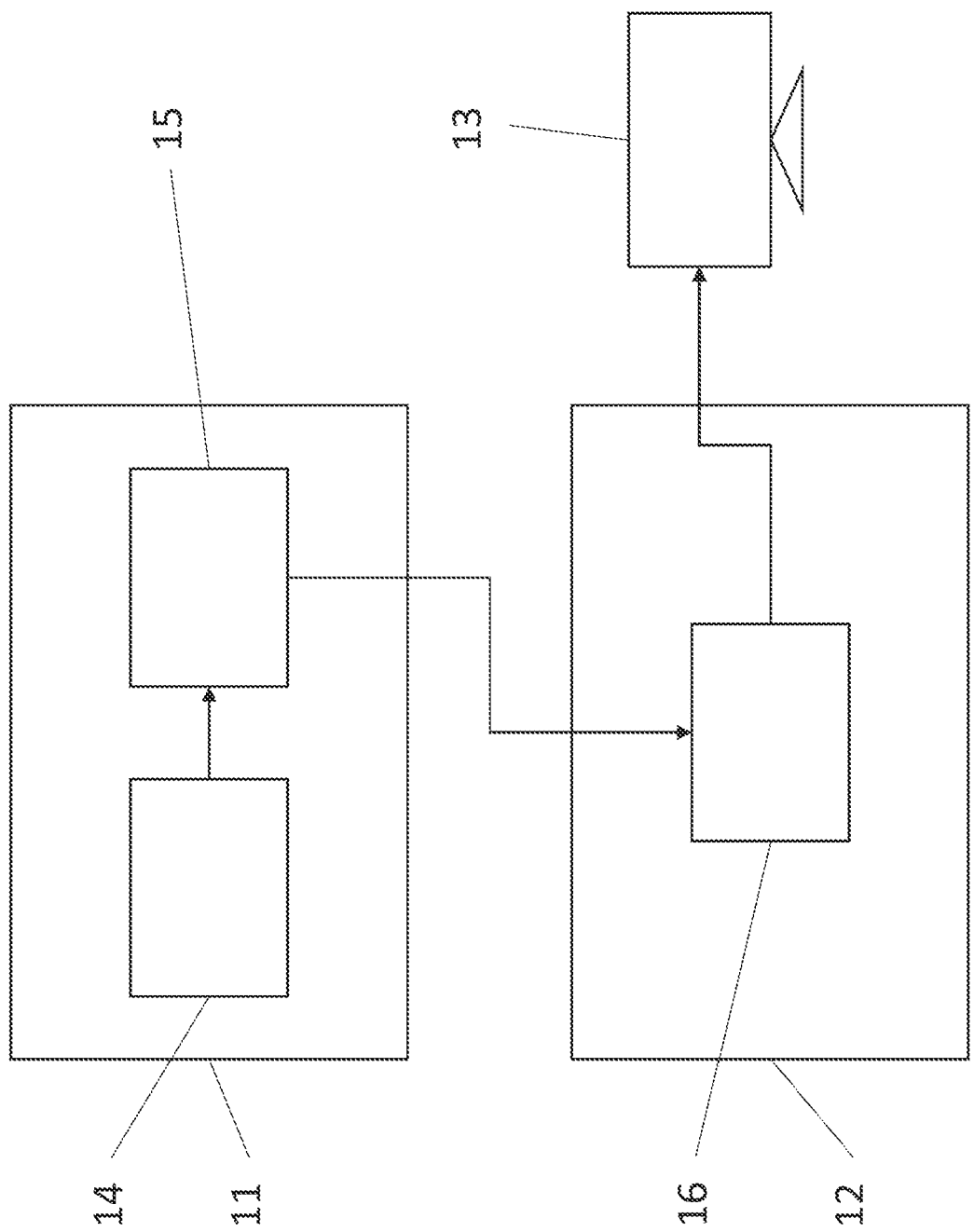

FIG. 3A

| A | B |
|---|---|
| C | D |

↑ 21

| (A+B)+(C+D) | (A-B)+(C-D) |
|---|---|
| (A+B)-(C+D) | (A-B)-(C-D) |

FIG. 3B

| 42 | 21 |
|---|---|
| 102 | 8 |

↑ 21

| 173 | 115 |
|---|---|
| -47 | -73 |

FIG. 3C

| 42 | 42 |
|---|---|
| 42 | 42 |

↑ 22

| 168 | 0 |
|---|---|
| 0 | 0 |

METHOD OF CONTROLLING ENCODING OF DISPLAY DATA

CROSS-REFERENCE TO RELATED APPLICATIONS

This application is a continuation of U.S. patent application Ser. No. 16/574,377, filed Sep. 18, 2019, which claims priority to U.K. Patent Application No. GB1815747.9, filed Sep. 27, 2018, the contents of which are both incorporated herein by reference in their entirety.

BACKGROUND

Image data is often transmitted between a device where it is generated and a device on which it is transferred. Often, the image data is transferred over a bandwidth limited transmission medium, and it is therefore often compressed (or encoded) prior to transmission in order to minimise the bandwidth required for its transmission. The compression is carried out using a compression (or encoding) algorithm. There are many different encoding algorithms and which one is used may depend on various factors, including the type of data, the level of compression required, etc.

It is sometimes possible to optimise an encoding algorithm to make it more effective for particular types of image data, such as data that has been upscaled or which only has very small changes among neighbouring pixels. This is beneficial because it can reduce the time required for compression as well as reducing power consumption and heating of the encoding device caused by intensive computation. However, such an optimised encoding algorithm is likely to have drawbacks; for example, it may result in excessive data loss where the image data is not suitable. It would therefore be beneficial to be able to switch between types of algorithm on the fly, during compression. Furthermore, entirely different types of compression algorithm may be suitable or unsuitable depending on the image data to be compressed.

The method of at least one embodiment of the invention seeks to provide a way of carrying out such switching.

SUMMARY

Accordingly, in a first aspect, the invention provides a method of encoding display data, the method comprising:

performing at least a part of a first predetermined transform algorithm of a plurality of different transform algorithms on at least a first part of a first frame of display data to generate a first set of transform coefficients;

analysing information relating to at least the first set of transform coefficients to determine whether a different transform algorithm of the plurality of different transform algorithms would be more suitable for encoding a second part of the first frame and/or a subsequent frame of the display data;

if it is determined that a different transform algorithm of the plurality of different transform algorithms would be more suitable for encoding, encoding the second part of the first frame and/or a subsequent frame of the display data using the different transform algorithm to generate an encoded first frame and/or subsequent frame; and if it is determined that a different transform algorithm of the plurality of different transform algorithms would not be more suitable for encoding, encoding the second part of the first frame and/or a subsequent frame of the display data using the first predetermined transform algorithm to generate an encoded first frame and/or subsequent frame.

In an embodiment, the first part of the first frame of display data comprises a tile or a group of tiles of the first frame, where in a tile comprises a plurality of pixels.

The plurality of different transform algorithms may, in an embodiment, comprise one or more Daubechies wavelet transform algorithms, wherein at least one of the Daubechies wavelet transform algorithms may comprise a Haar wavelet transform algorithm. Preferably, the first set of transform coefficients comprises transform coefficients of a tile of pixels of the first frame of display data. Analysing information relating to the first set of transform coefficients preferably comprises determining a count of a number of transform coefficients that have a zero value in the first set of transform coefficients and determining whether the count is above or below a threshold.

The method may further comprise transmitting the encoded first frame and/or subsequent frame over a bandwidth limited transmission medium to a display control device.

In a preferred embodiment, determining that a different transform algorithm would be more suitable comprises determining that the different transform algorithm would be more efficient or faster or provide higher quality output.

According to a second aspect, the invention provides an apparatus for encoding display data, the apparatus configured to perform all steps of a method as described above.

According to a third aspect, the invention provides a system comprising:

an apparatus as described above; and a display control device configured to receive the encoded first frame and/or subsequent frame and to decode the encoded first frame and/or subsequent frame prior to display on a display device.

According to a further aspect, there is provided a method of determining the appropriate compression algorithm for encoding each of a stream of frames of image data, comprising:

A computing device generating a first frame, F1, and encoding it using a first compression algorithm, C1;

The computing device recording values, V1, produced by the encoding of F1;

The computing device analysing V1 to determine whether F1 would have been suitable for an optimised encoding algorithm;

The computing device generating a second frame, F2;

If F1 was not suitable for an optimised encoding algorithm, the computing device encoding F2 using C1;

If F1 was suitable for an optimised encoding algorithm, the computing device encoding F2 using a second compression algorithm, C2; and The computing device recording values, V2, produced by the encoding of F2.

According to a still further aspect, there is provided a method of determining the appropriate compression algorithm for encoding a frame of image data comprises:

A computing device generating a frame F1;

The computing device encoding a part of F1 using a first compression algorithm, C1;

The computing device recording values, V1, produced by the encoding of F1;

The computing device analysing V1 to estimate whether F1 would have been suitable for an optimised encoding algorithm, C2;

If F1 is not suitable for an optimised encoding algorithm, the computing device encoding F1 using C1; and If F1 is suitable for an optimised encoding algorithm, the computing device encoding F1 using C2.

Optionally, values, V2 may be recorded at the end of this version of the method and used as V1 in the first version of the process.

This method will enable the computing device to determine whether an optimised encoding algorithm can beneficially be used to encode a frame; if it is suitable for an optimised encoding algorithm, the optimised encoding algorithm can be used, otherwise a normal encoding algorithm can be used.

Additionally, where the computing device has determined that it should compress a frame using C2, it may further compress a sample of the frame using C1 in order to judge the results that would have been produced had the frame been compressed using C1. Values produced by this compression may be used as well as or instead of V2.

BRIEF DESCRIPTION OF THE DRAWINGS

Embodiments of the invention will now be more fully described, by way of example, with reference to the drawings, of which:

FIG. 1 shows an example system according to an embodiment of the present invention;

FIGS. 3A, 3B, and 3C show the different results of a Haar transform performed on different collections of pixels;

DETAILED DESCRIPTION OF THE DRAWINGS

FIG. 1 shows a block diagram of a system that can be used to implement methods according to some embodiments of the invention. A host computing device [11] is connected to a display control device [12], which in turn is connected to a display device [13]. The connections may be wired or wireless and may also or instead be over a network, including the internet. Furthermore, any two or more of the devices may be co-located: i.e. sharing the same casing and appearing to be a single device. However, it is likely that the host computing device [11] and the display control device [12] will be separated and connected by a transmission medium such as USB, Wi-Fi, Bluetooth etc. which has a limited bandwidth. It is therefore useful for the data transmitted across that connection to be compressed in order to maximise the speed and quantity of transmission.

The host device [11] includes, among other components, an application executed on a processor [14] which generates display data for display on the display device [13] and a compression engine [15] which compresses the data generated by the application executed on the processor [14] for transmission to the display control device [12].

The display control device [12] includes, among other components, a decompression engine [16] which receives the compressed data transmitted by the host device [11] and decompresses it, then passes it to the display device [13] for display.

Figure 2B:
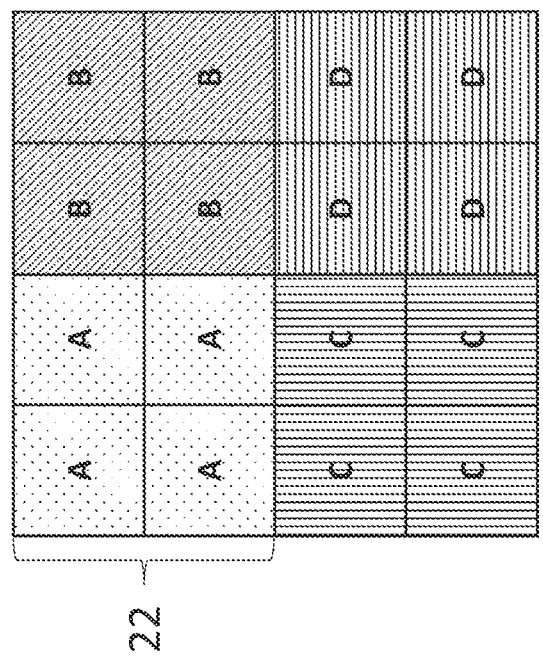
FIGS. 2A and 2B show examples of collections of pixels.
Figure 2A:
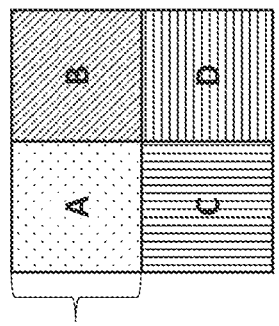

FIG. 2A shows a group of four pixels [21] which all have different values, indicated by their different patterns of hatching. The first pixel [21A] is hatched with dots and is considered to have a light colour, the second pixel [21B] is hatched with diagonal lines and is considered to have a dark colour, the third pixel [21C] and fourth pixel [21D] are hatched with vertical and horizontal lines respectively and considered to have middle colours.

FIG. 2B shows four groups [22], each of four pixels [21], of which each group [22] has a different colour but the pixels [21] within each group are the same colour. Again, these colours are indicated by different patterns of hatching.

FIG. 3A shows the basic process of a Haar transform, which is used by many encoding schemes. One pass of a Haar transform operates by taking a group of four units of display data, in this example pixels labelled as A, B, C, and D, which have been produced by the application executing on the processor [14] and passed to the compression engine [15]. The values of the four pixels [21] in the group, known as a tile, are combined using the formulae shown to the right of the Figure and these combined values are stored in place of the original values. The "A" pixel [21A] is replaced with a sum of all four pixels [21], known as the "DC" value, while the other three pixels [21B, C, D] are replaced with coefficients generated using the other formulae as follows:

$$B \to (A-B)+(C-D) \qquad \text{(AC1)}$$

$$C \to (A+B)-(C+D) \qquad \text{(AC2)}$$

$$D \to (A-B)-(C-D) \qquad \text{(AC3)}$$

These values are known as "AC" values or high-frequency coefficients.

Any or all of these values may then be quantised, i.e. divided by a constant in order to produce a smaller number which will be less accurate but can be more effectively compressed.

As part of this process, a value known as a zero count can be produced. A zero count is the number of zeroes (or trailing zeroes) when a collection of pixels has been put through a Haar transform and the coefficients have been appropriately ordered from coarse to fine detail.

These calculations are then reversed as part of decompression after transmission to the display control device [12].

FIG. 3B shows an example of how these calculations are carried out on actual data in an example collection of pixels [21] such as that shown in FIG. 2A, in which all the pixels [21] have different values. The formulae described in FIG. 3A are applied to give the following values:

$$(42+21)+(102+8)=173 \qquad \text{DC:}$$

$$(42-21)+(102-8)=115 \qquad \text{AC1:}$$

$$(42+21)-(102+8)=-47 \qquad \text{AC2:}$$

$$(42-21)-(102-8)=-73 \qquad \text{AC3:}$$

None of these values are 0, therefore this transform result has a zero count of 0.

FIG. 3C shows a second example in which the collection [22] of pixels might be one of those described in FIG. 2B, which had four sets of four identical pixels [21]. In this case, the formulae described in FIG. 3A might be applied to give the following values:

$$(42+42)+(42+42)=168 \qquad \text{DC:}$$

$$(42-42)+(42-42)=0 \qquad \text{AC1:}$$

$$(42+42)-(42+42)=0 \qquad \text{AC2:}$$

$$(42-42)-(42-42)=0 \qquad \text{AC3:}$$

Three of these values are 0, therefore this transform result has a zero count of 3.

In a third example, not shown in the Figure, the pixels might be very similar but not identical. For example:

A=42
B=41
C=40
D=43

In this case, the formulae described in FIG. 3A might be applied to give the following values:

$$DC=(42+41)+(40+43)=166$$

$$AC1=(42-41)+(40-43)=-2$$

$$AC2=(42+41)-(40+43)=0$$

$$AC3=(42-41)-(40-43)=4$$

Although this transform result has a zero count of only 1, quantisation might then be applied to reduce the detail of the AC values (and possibly also the DC value), meaning that rounding error will occur that is likely to render small numbers as 0. This could result in the values of AC1 and AC3 becoming 0 and therefore the transform result having a zero count of 3.

Commonly, multiple passes of a Haar transform will be carried out on a frame of display data. Furthermore, although the theory of a Haar transform and a zero count have been described here with reference to a single tile, the invention may use the zero count of any number of tiles or groups of tiles, up to and including a whole frame.

FIGS. 3A, 3B, and 3C describe the process of a standard Haar transform, which is a commonly-used sub-type of the Daubechies wavelet transform. Other similar transforms also exist, as well as variations on the standard transform, but methods such as that described herein can still be used as modifications to such transforms.

For example, the values of high-frequency coefficients may indicate the spatial frequency of the image, i.e. whether there is a large variation between pixels caused by sharp edges in the image. Where there is relatively high spatial frequency, using a wavelet-based compression algorithm, such as JPEG XS, may lead to a better result, while if the spatial frequency is relatively low, using a compression algorithm based on a Discrete Cosine Transform (DCT) such as HEVC, H.264, or H.265 may give a better result. Similarly, variation in the coefficient values generated may indicate the colour depth of the frame and the number of quantisation steps that will be required to reduce the data to a particular volume, which may also indicate a more efficient alternative type of compression.

As a further example, a common colour space used in the encoding of display data is YUV, which comprises one luma component (Y), which indicates the brightness of the display data, and two chrominance or chroma components (U and V), which indicate the colour. A luma-only signal is therefore monochrome but contains the majority of the detail in the display data. An embodiment of the invention could therefore carry out a comparison of a collection of pixels within a tile such as those shown in FIGS. 2A and 2B in order to determine the differences between their luma values. If the differences are below a threshold, the display data could be considered suitable and the optimised encoding algorithm used. Methods for determining the variation in the display data can also be used on a mipmap, which is a scaled-down version of a frame of display data produced as part of the process of generating the display data and other methods of determining the variance of the data can be used.

In any case, suitability of one compression algorithm over another will depend on the exact implementation; different implementations may prioritise speed, reduction in computing power required, compression ratio, quality of output, etc. and the comparison used and decisions made by the method of the invention should be calibrated to reflect this.

For example, in a system where the host device [11] is a mobile device running on battery power, it may be more appropriate to use a compression algorithm which minimises the amount of data processing required—and therefore the amount of power used—whenever this will not compromise the quality of the displayed data. Accordingly, where there is a high zero count the data could be compressed with only two passes of a Haar transform, which will require less processing, and only when there is a low zero count and the data is therefore complex would a third pass be used.

Accordingly, the embodiments described herein are examples only.

Figure 4A:
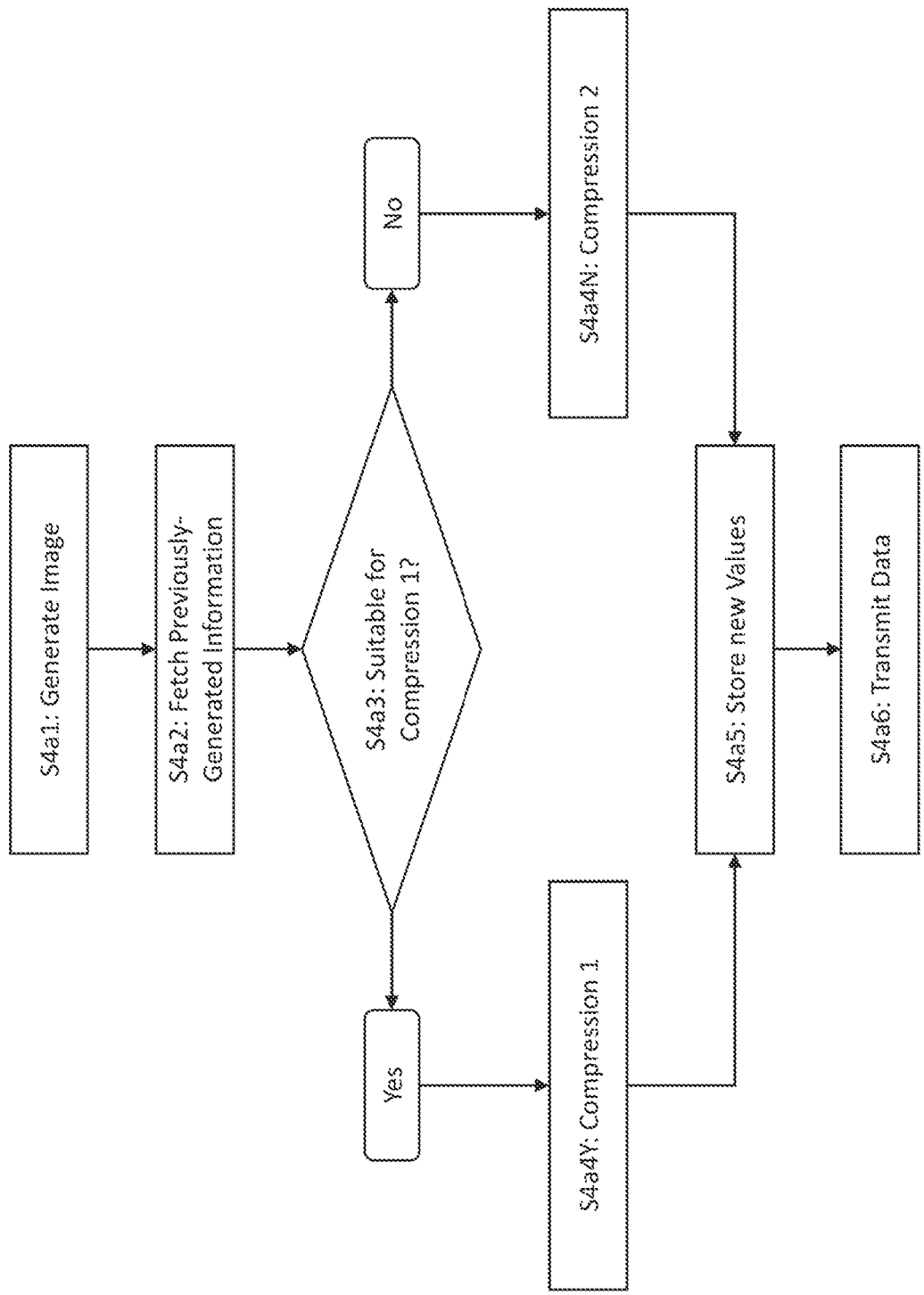
FIGS. 4A and 4B show examples of processes according to embodiments of the invention.
Figure 4B:
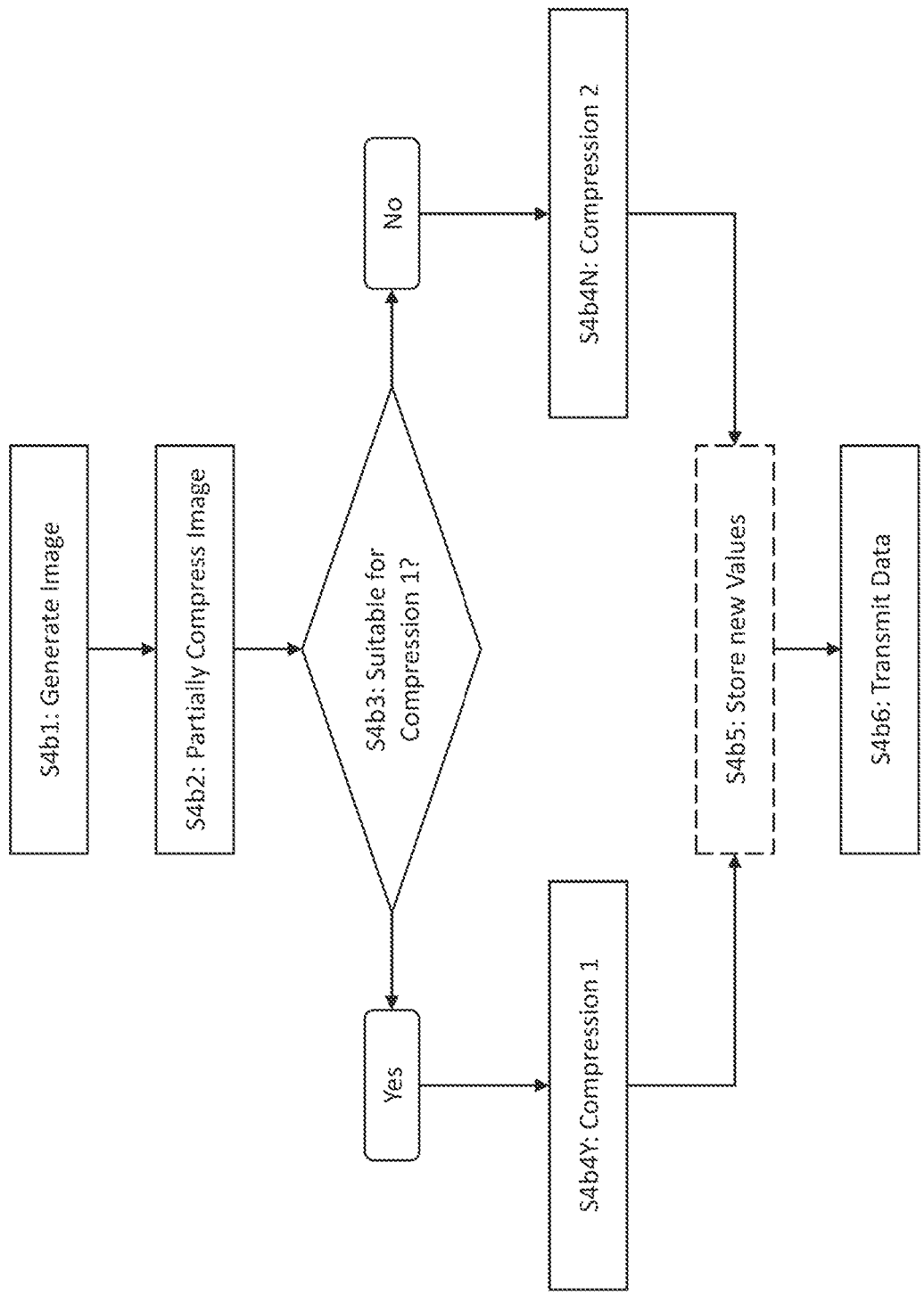

FIGS. 4A and 4B show basic example processes of the invention which could be used with many metrics. However, for simplicity, zero count will be used in this description to illustrate the use of coefficients in the basic method of the invention.

FIG. 4A describes a method that can be used to determine the most suitable encoding algorithm for each frame in a stream of whole frames, using information from analysis of previous frames in the stream.

At Step S4a1, the application executing on the processor [14] generates a frame of display data. In a video stream, this may be the next frame to be displayed and may be more or less complex, but in many cases there will be areas of the frame that have similar or only gradually-changing colours. The processor [14] passes the frame to the compression engine [15] for compression.

At Step S4a2, the compression engine [15] fetches stored information based on the coefficients generated during compression of a previous frame or frames. This may mean the immediately previous frame or another frame earlier in the sequence, such as the last time a particular view was shown. For example, in a virtual-reality or augmented-reality environment, information may be stored for each view of the virtual world presented to the user, since such information will provide a hint for compression when the user looks in the same direction from the same location again. Alternatively, the information may be derived from the coefficients generated during compression of multiple previous frames, for example an average of a particular coefficient value over three frames.

In this example, the information fetched is the stored zero count (ZC) for the immediately previous frame. In this example, the information is not the actual coefficients, but is derived from the coefficients.

At Step S4a3, the compression engine [15] compares the fetched information to a threshold in order to determine whether the previous frame or frames was/were or would have been suitable for compression with a first compression algorithm or a different compression algorithm. This is likely to be indicative of whether the current frame is likely to be suitable for compression with the first compression algorithm or a different compression algorithm, since in a video stream any given frame is likely to be broadly similar to its predecessors.

In this example, the compression engine [15] compares the ZC to a threshold in order to estimate the degree to which the previous frame had large areas of similar colours, as indicated in FIGS. 2A, 2B, 3A, 3B, and 3C: where there are not large areas of the same colour, the ZC will be low, as in the case shown in FIG. 2A and FIG. 3B, but where there are large areas of the same colour the ZC will be high, as in the case shown in FIG. 2B and FIG. 3C.

If the compression engine [15] determines that the information regarding the previous frame or frames indicates that it/they was/were suitable for the first compression algorithm—in this example, if the fetched ZC is above the threshold—the process follows the branch to the left beginning at "Yes" and the compression engine [15] compresses the frame using the first compression algorithm at Step S4a4Y. This compression algorithm might be optimised in a particular way, for example designed to more efficiently deal with large areas of the same colour such as those indicated by the relatively high ZC. For example, it might involve omitting a pass of a Haar transform or using a different level of quantisation such that the level of quantisation used is reduced where the ZC is above a threshold since there is less variation between pixels and therefore less quantisation is required.

If the compression engine [15] determines that the information regarding the previous frame or frames indicates that it/they was/were not suitable for the first compression algorithm—for example, the ZC is below the threshold—the process follows the branch to the right beginning at "No" and the compression engine [15] compresses the frame using the second compression algorithm at Step S4a4N. This compression algorithm might, for example, be more computationally intensive and/or result in increased data loss, since in this example it will be more sophisticated and designed to handle data which has fewer large areas of the same colour and is harder to encode. For example, it might involve performing three passes of a Haar transform.

In either case, a new set of coefficients will be generated as part of the compression process—and a new ZC, in this example—and this is stored in the compression engine [15] at Step S4a5 for use in determining the compression algorithm to be used for future frames as appropriate. Finally, at Step S4a6 the compressed data is transmitted to the display control device [12] over a bandwidth-limited transmission medium such as that previously described for decompression and display.

FIG. 4B describes a version of the method that can be used to determine the appropriate compression algorithm to be used for each frame based on a partial encoding of each frame individually, without a requirement for stored values from previous frames.

At Step S4b1, the application [14] generates a frame of display data and passes the frame to the compression engine [15] for compression as previously described.

At Step S4b2, the compression engine [15] partially compresses the received frame using a first compression algorithm. This may mean compressing a particular portion of the received frame such as a selection of tiles or rows, where a tile is a plurality of pixels, or it may mean carrying out part of a compression process such as the first two passes of a Haar transform as previously described. Naturally, these may be combined such that a part of the frame is partially compressed. The size of the part of the frame compressed or the proportion of the process that is carried out should be determined based on the confidence required: the more important it is that the right compression algorithm is selected, the greater the part of the frame compressed or proportion of the compression process carried out should be.

This partial compression will produce coefficient values which the compression engine [15] can then analyse to determine, at Step S4b3, whether the first compression algorithm is the most suitable algorithm for compressing the whole frame. For example, the partial compression may produce a zero count which the compression engine [15] can compare to a threshold as previously described.

If the compression engine [15] determines that the frame is likely to be suitable for compression with the first compression algorithm, the process follows the branch to the left beginning at "Yes" and the compression engine [15] applies the first type of compression to the whole frame at Step S4b4Y. Where the partial compression comprised carrying out part of a compression process, this may mean carrying out the remainder of the compression process on the whole frame, and where the partial compression comprised compressing part of the frame, the remainder may at this point be compressed. In both cases, the compression algorithm may be applied to the entire frame as if no compression had already been carried out.

If the compression engine [15] determines that the frame is not likely to be suitable for compression with the first compression algorithm, the process follows the branch to the right beginning at "No" and the compression engine [15] applies the second type of compression to the whole frame at Step S4b4N. Naturally, this will need to be carried out as if no compression had already been carried out.

Optionally, at Step S4b5, after compression is complete some coefficient values could be stored for later use in selecting an appropriate compression algorithm. For example, this version of the process could be used for the first frame in a stream and the version of the process described in FIG. 4A could be used for subsequent frames. In any case, at Step S4b6 the compressed data is transmitted to the display control device [12] over a bandwidth-limited transmission medium as previously described for decompression and display.

These example methods are described as if only two compression algorithms are available, but this is only for the sake of simplicity; a plurality of compression algorithms may be available and the compression engine [15] may select between them by iterating a method that chooses between two at a time or by applying multiple thresholds.

Figure 5:
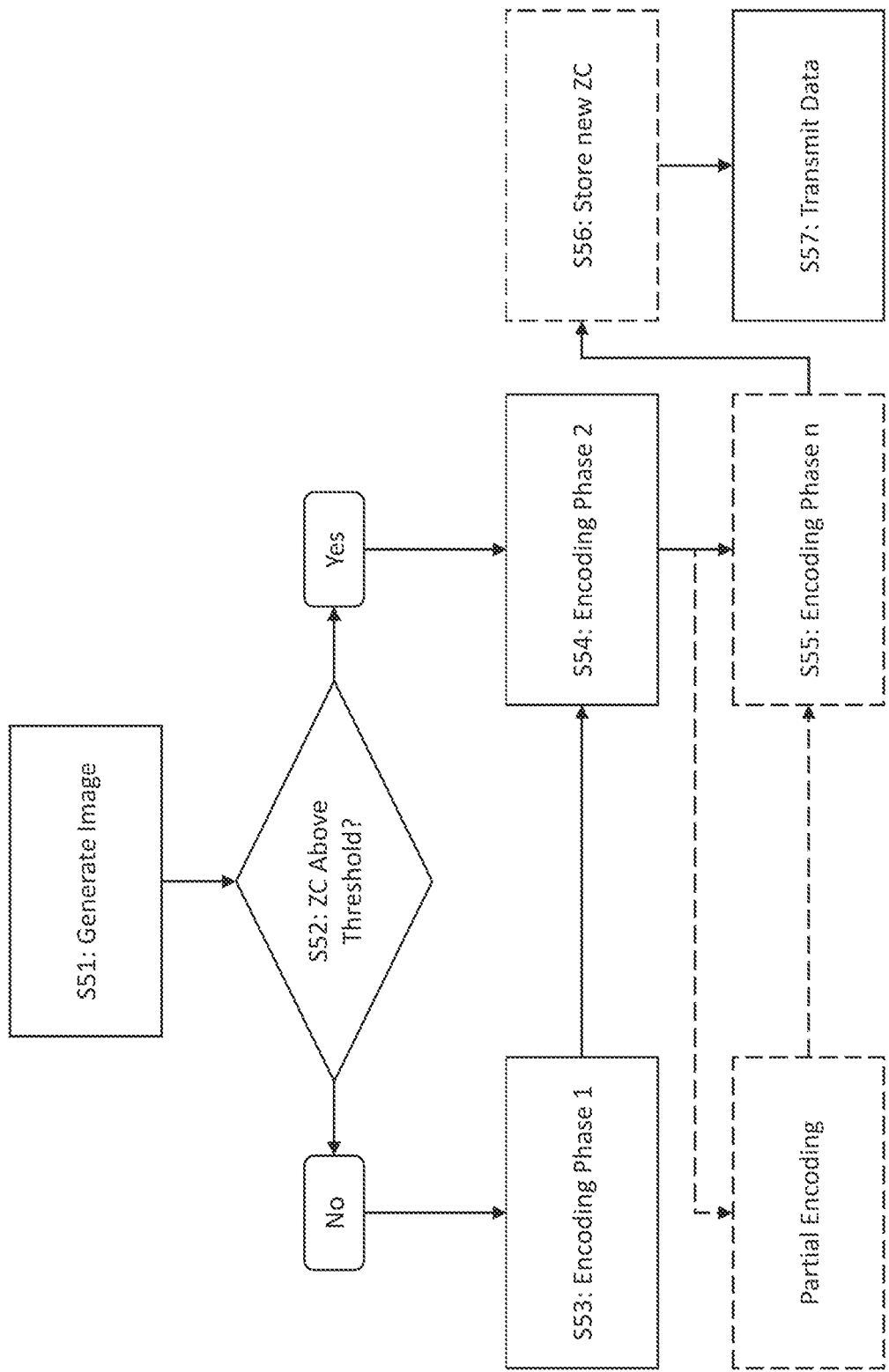
FIG. 5 shows a further example of a process according to an embodiment of the invention.

FIG. 5 shows a more detailed example process of the invention. This example is specifically based on the use of a Haar transform, but other transforms could be used in a similar way.

At Step S51, as previously mentioned, the application [14] generates a frame of display data for display and passes it to the compression engine [15].

At Step S52, as previously mentioned, the compression engine [15] compares a stored ZC to a threshold to determine which compression algorithm to use to compress the new frame of display data. In this example, the difference between the compression algorithms is the number of passes of a Haar transform such that in the case of "busy" data without many large areas of the same colour the compression engine [15] will perform more passes of the Haar transform than in the case of "simple" data.

If the ZC is above the threshold, the process follows the branch to the right beginning at "Yes" to Step S54: a pass of the Haar transform. If the ZC was not above the threshold, the process follows the branch to the left beginning at "No" to Step S53. This is also a pass of the Haar transform, but the process then proceeds to Step S54 to carry out a further pass. Thus, Step S53 acts as a first phase of encoding which can be omitted if the frame comprises simple data.

The process may then perform any number of further passes of the Haar transform at Step S55. In this example, there is one more pass to total three passes for busy data and two for simple data. In any case, the encoding process produces a new ZC, which is stored at Step S56. The compression engine [15] then transmits the data for display as previously described at Step S57.

Optionally, while encoding the data, the compression engine [15] may always compress a representative sample of the frame using the first compression algorithm, or the algorithm used for busy data, and check the ZC generated by this partial encoding. This is beneficial because it allows a more accurate determination of the ZC that would have been generated by the use of the first compression algorithm for the whole frame, since the ZC generated by the second compression algorithm is likely to be different. This partial ZC can then be used to determine when the compression algorithm should switch from the second compression algorithm back to the first.

Furthermore, as previously mentioned a ZC can be calculated for only part of a frame. This means that there may be multiple ZCs for a single frame and therefore that the methods of the invention could be used for only part of a frame or independently for different parts of a frame.

As previously mentioned, other metrics can be used to determine whether an optimised encoding algorithm should be used. An example of such a metric, based on light level and using coefficients produced by compression of YUV values as previously mentioned, is described with reference to FIG. 6.

Because the sensitivity of the human eye is non-linear, it can perceive subtle differences in colour very well once it has adjusted to a low light level. This means that data loss during the encoding process can result in a poor user experience when viewing low-light scenes, and therefore that low-light scenes can in some circumstances require different compression algorithms due to the increased detail required. The methods of the invention may therefore be useful to determine whether to use an encoding algorithm that may result in increased data loss.

At Step S61, the application [14] generates a frame of display data as previously described.

At Step S62, the compression engine [15] determines the overall light level of the frame of display data. It may make this determination in one of a variety of ways, for example by performing a Haar transform as previously described and checking the DC coefficients produced in the luma channel to determine the overall average luma value of the frame. This determination can also be improved by checking the overall average light level of a previous frame, since in a stream of frames of display data it is unlikely to be substantially different, and/or by using a mipmap produced by the GPU on the host device [11] to determine an average luma value.

Furthermore, such methods could be combined with previously-mentioned methods to determine the overall "busyness" of the frame and the behaviour of the system changed accordingly. For the purposes of this description, the method will be described as if light level were the only factor in whether or not the data is suitable for a specialised encoding algorithm.

Figure 6:
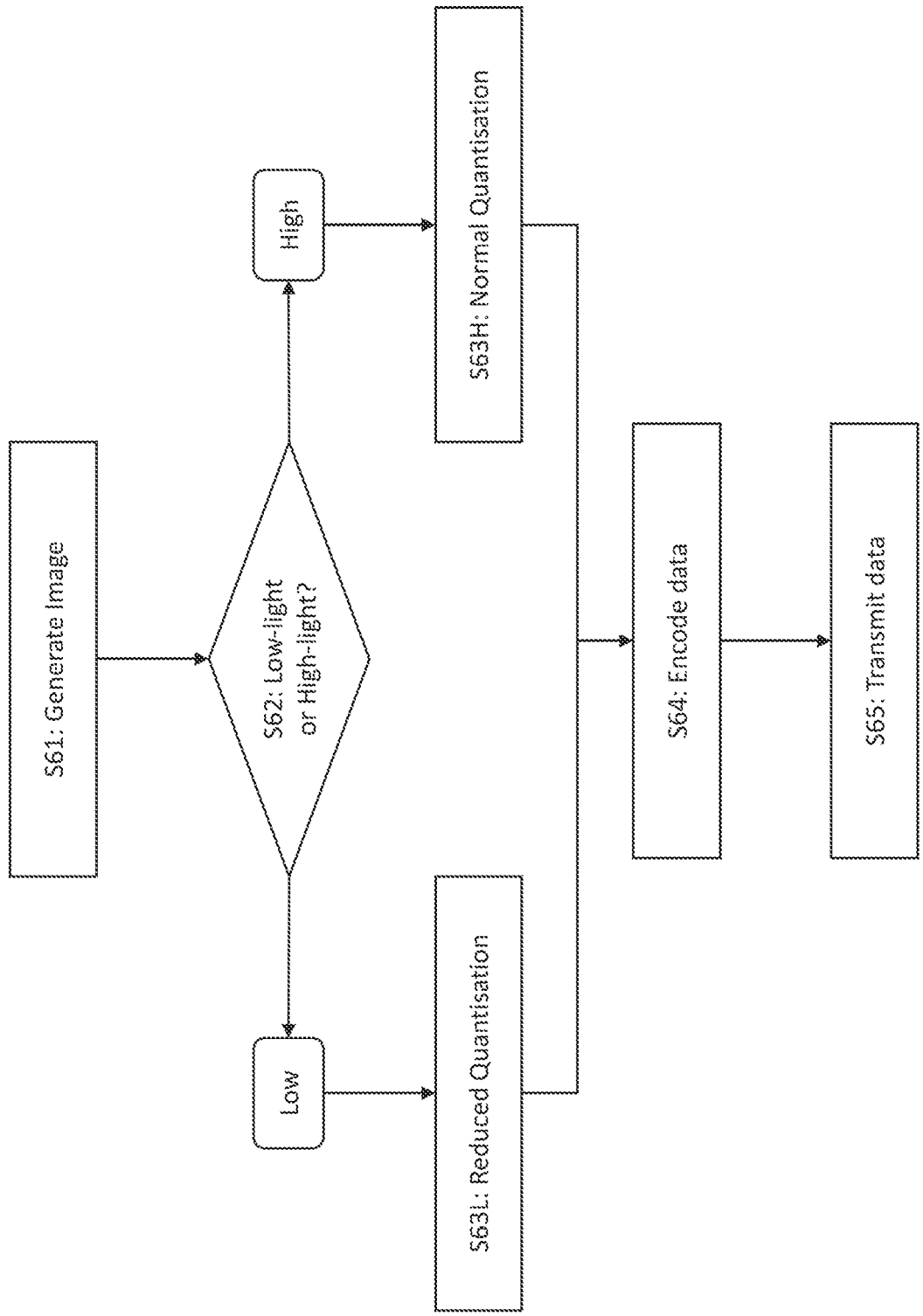
FIG. 6 shows a still further example of a process according to an embodiment of the invention.

If the frame is determined to have a low average light level and therefore potentially to be suitable for a specialised low-light compression algorithm, the process follows the branch to the left of FIG. 6 beginning at "Low". At Step S63L the compression engine [15] compresses the data using a first compression algorithm which might, for example, include reduced quantisation, resulting in bulkier data compared to a second compression algorithm but less data loss.

If the frame is determined at Step S62 to have a high average light level and therefore less likely to be suitable for a specialised encoding algorithm, the process follows the branch to the right of FIG. 6 beginning at "High" and at Step S63H the compression engine [15] compresses the data using a compression algorithm that might, for example, include increased quantisation, resulting in greater loss of detail in the final frame but decreased data volume.

Naturally, in some circumstances these assumptions may be reversed, and low-light frames may be considered suitable for a compression algorithm which includes increased quantisation, for example, while high-light frames are not, and other variations to encoding methods and compression algorithms can be used.

In both cases, at Step S64 the data is encoded with the selected compression algorithm and transmitted at Step S65 as previously described. If appropriate, the light level of the encoded frame may also be stored for use in determining the compression algorithm to be used for the next frame.

Figure 7:
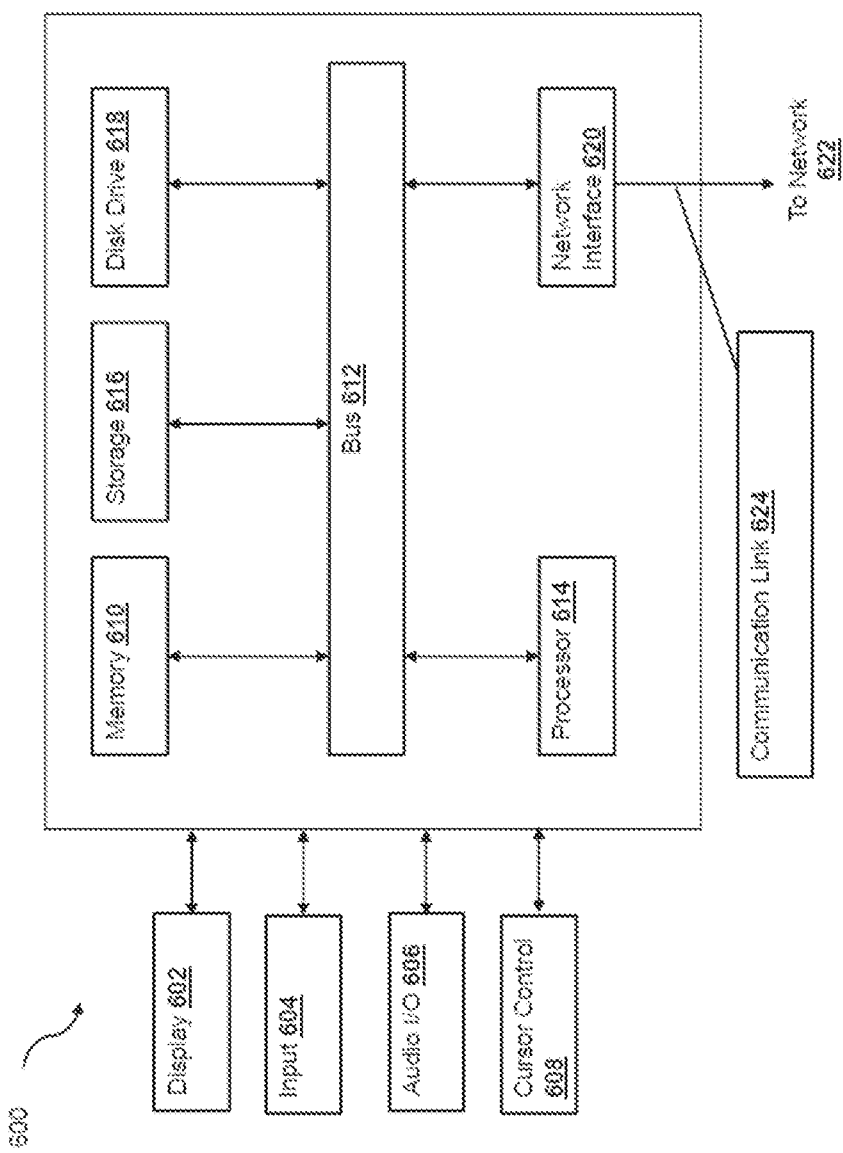
FIG. 7 is a block diagram of a computer system suitable for implementing one or more embodiments.

FIG. 7 is a block diagram of a computer system [600] suitable for implementing one or more embodiments of the present disclosure, including the host computer device [11], and the display control device [12]. In various implementations, the display control device [12] may include a personal computer (PC), laptop, etc., which may be adapted for wireless communication, and the host computer device [11] may include a network computing device, such as a server. Thus, it should be appreciated that the devices [11] and [12] may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the model generation functionalities described herein according to the process 400.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of encoding display data, the method comprising:
    performing at least a part of a first predetermined transform algorithm of a plurality of different transform algorithms on at least a first part of a first frame of display data;
    analyzing a light level of the first frame of display data to determine whether a different transform algorithm of the plurality of different transform algorithms would be more suitable for encoding a second part of the first frame of the display data;
    if it is determined that a different transform algorithm of the plurality of different transform algorithms would be more suitable for encoding, encoding the second part of the first frame of the display data using the different transform algorithm to generate an encoded first frame; and
    if it is determined that a different transform algorithm of the plurality of different transform algorithms would not be more suitable for encoding, encoding the second part of the first frame of the display data using the first predetermined transform algorithm to generate the encoded first frame.

2. The method of claim 1, wherein the analyzing of the light level of the first frame of the display data comprises:
    analyzing information related to a first set of transform coefficients generated during the performance of the first predetermined transform algorithm on the at least the first part of the first frame of the display data to determine the light level of the first frame of the display data.

3. The method of claim 1, wherein analyzing the light level of the first frame of display data comprises:
    analyzing a previous frame of the display data to determine a light level of the previous frame; and
    using a mipmap of the light level of the previous frame as the light level of the first frame of the display data.

4. The method of claim 1, wherein the first predetermined transform algorithm is a specialized low-light compression algorithm.

5. The method of claim 1, wherein the different transform algorithm is an algorithm that utilizes reduced quantization.

6. The method of claim 1, further comprising:
    storing a light level of the encoded first frame for using in determining a compression algorithm to be used for a subsequent frame of the display data.

7. The method of claim 1, further comprising:
    after encoding the second part of the first frame of the display data using the different transform algorithm to generate the encoded first frame, performing a second encoding pass of the second part of the first frame of the display data using the first predetermined transform algorithm to generate a further encoded first frame.

8. The method of claim 1, wherein the first part of the first frame of display data comprises a tile or a group of tiles of the first frame, and wherein a tile comprises a plurality of pixels.

9. The method of claim 1, wherein the plurality of different transform algorithms comprises one or more Daubechies wavelet transform algorithms, and wherein at least one of the Daubechies wavelet transform algorithms comprises a Haar wavelet transform algorithm.

10. The method of claim 1, further comprising:
transmitting the encoded first frame over a bandwidth limited transmission medium to a display control device.

11. A system comprising:
a non-transitory memory storing instructions; and
one or more hardware processors coupled to the non-transitory memory and configured to execute the instructions from the non-transitory memory to cause the system to perform operations comprising:
performing at least a part of a first predetermined transform algorithm of a plurality of different transform algorithms on at least a first part of a first frame of display data;
analyzing a light level of the first frame of display data to determine whether a different transform algorithm of the plurality of different transform algorithms would be more suitable for encoding a second part of the first frame of the display data;
if it is determined that a different transform algorithm of the plurality of different transform algorithms would be more suitable for encoding, encoding the second part of the first frame of the display data using the different transform algorithm to generate an encoded first frame; and
if it is determined that a different transform algorithm of the plurality of different transform algorithms would not be more suitable for encoding, encoding the second part of the first frame of the display data using the first predetermined transform algorithm to generate the encoded first frame.

12. The system of claim 11, wherein the instructions to analyze of the light level of the first frame of the display data further cause the system to perform the operations comprising:
analyzing information related to a first set of transform coefficients generated during the performance of the first predetermined transform algorithm on the at least the first part of the first frame of the display data to determine the light level of the first frame of the display data.

13. The system of claim 11, wherein the instructions to analyze of the light level of the first frame of the display data further cause the system to perform the operations comprising:
analyzing a previous frame of the display data to determine a light level of the previous frame; and
using a mipmap of the light level of the previous frame as the light level of the first frame of the display data.

14. The system of claim 11, wherein the first predetermined transform algorithm is a specialized low-light compression algorithm.

15. The system of claim 11, wherein the different transform algorithm is an algorithm that utilizes reduced quantization.

16. The system of claim 11, wherein the instructions further cause the system to perform operations comprising:
storing a light level of the encoded first frame for using in determining a compression algorithm to be used for a subsequent frame of the display data.

17. The system of claim 11, wherein the instructions further cause the system to perform operations comprising:
after encoding the second part of the first frame of the display data using the different transform algorithm to generate the encoded first frame, performing a second encoding pass of the second part of the first frame of the display data using the first predetermined transform algorithm to generate a further encoded first frame.

18. The system of claim 11, wherein the first part of the first frame of display data comprises a tile or a group of tiles of the first frame, and wherein a tile comprises a plurality of pixels.

19. The system of claim 11, wherein the plurality of different transform algorithms comprises one or more Daubechies wavelet transform algorithms, and wherein at least one of the Daubechies wavelet transform algorithms comprises a Haar wavelet transform algorithm.

20. The system of claim 11, wherein the instructions further cause the system to perform operations comprising:
transmitting the encoded first frame over a bandwidth limited transmission medium to a display control device.

* * * * *